US012730940B2

(12) United States Patent
Ghosh et al.

(10) Patent No.: US 12,730,940 B2
(45) Date of Patent: Sep. 8, 2026

(54) STATE CLEARING OF INTERNAL MEMORY AND FLIP-FLOPS OF A SYSTEM USING BUILT-IN TEST AND SCAN CIRCUITRY

(71) Applicant: Microsoft Technology Licensing, LLC, Redmond, WA (US)

(72) Inventors: Pradipta Kumar Ghosh, Palo Alto, CA (US); Suresh Duthiraru, Portland, OR (US); Brian Matthew Sutton, West Lafayette, IN (US)

(73) Assignee: Microsoft Technology Licensing, LLC, Redmond, WA (US)

(*) Notice: Subject to any disclaimer, the term of this patent is extended or adjusted under 35 U.S.C. 154(b) by 159 days.

(21) Appl. No.: 18/741,536

(22) Filed: Jun. 12, 2024

(65) Prior Publication Data

US 2025/0384168 A1 Dec. 18, 2025

(51) Int. Cl.
*G06F 21/78* (2013.01)
*G01R 31/3185* (2006.01)
*G01R 31/3187* (2006.01)

(52) U.S. Cl.
CPC ..... *G06F 21/78* (2013.01); *G01R 31/318525* (2013.01); *G01R 31/318597* (2013.01); *G01R 31/3187* (2013.01)

(58) Field of Classification Search
CPC ...... G06F 21/78; G06F 11/1004; G06F 11/27; G01R 31/3187; G01R 31/318525

(Continued)

(56) References Cited

U.S. PATENT DOCUMENTS 6,694,495 B1 * 2/2004 Hussain ................ G11C 29/56 714/724
7,502,976 B2 * 3/2009 Ross ................. G11C 29/1201 365/201

(Continued)

FOREIGN PATENT DOCUMENTS

WO 2008100495 A1 8/2008

OTHER PUBLICATIONS

International Search Report and Written Opinion received for PCT Application No. PCT/US2025/019085, mailed on May 27, 2025, 14 pages.

(Continued)

*Primary Examiner* — Lizbeth Torres-Diaz
(74) *Attorney, Agent, or Firm* — Michael T. Abramson; Jordan IP Law, LLC

(57) ABSTRACT

Systems and methods for state clearing of internal memory and flip-flops of a system using built-in test and scan circuitry are provided. A method includes a security processor: (1) fetching memory built-in self-test (MBIST) data and providing the MBIST data to an internal field-test (IFT) controller such that the IFT controller can drive the MBIST data via an IJTAG network to respective MBIST controllers, and (2) fetching scan data and providing the scan data to the IFT controller such that the IFT controller can drive the scan data via a scan network to respective embedded deterministic test (EDT) controllers. The method further includes each of the respective MBIST controllers state clearing respective internal memories by writing pertinent MBIST data into the respective internal memories. The method further includes each of the respective EDT controllers state clearing respective flip-flops by writing pertinent scan data into the respective flip-flops.

20 Claims, 6 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 9,689,919 | B2 * | 6/2017 | Zhao | G11C 29/26 |
| 9,805,826 | B2 * | 10/2017 | Sang | G11C 29/32 |
| 11,940,494 | B2 * | 3/2024 | Son | G01R 31/31935 |
| 2008/0163186 | A1 | 7/2008 | Devarajan | |
| 2012/0304030 | A1 * | 11/2012 | Haufe | G01R 31/318385 714/724 |
| 2019/0113568 | A1 * | 4/2019 | Bowling | G11C 29/26 |
| 2019/0235019 | A1 * | 8/2019 | Ziaja | G01R 31/318555 |
| 2024/0095208 | A1 * | 3/2024 | Verma | G06F 15/7882 |
| 2024/0160745 | A1 * | 5/2024 | Srivastava | G06F 11/27 |

OTHER PUBLICATIONS

John, et al., “BIST Architecture for Multiple RAMs in SoC,” ScienceDirect, 7th International Conference on Advances in Computing & Communications, ICACC-2017, vol. 115, Aug. 22-24, 2017, pp. 159-165.

* cited by examiner

STATE CLEARING OF INTERNAL MEMORY AND FLIP-FLOPS OF A SYSTEM USING BUILT-IN TEST AND SCAN CIRCUITRY

BACKGROUND

Increasingly, computing, storage, and network resources are accessed via the public cloud, private cloud, or a hybrid of the two. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers.

Users of the cloud system typically have access to the platform hardware and the operating systems and other authorized applications running on the platform. Multiple users can have access to the same hardware offered by the platform, including a server, or a cluster of servers, over time. To allow for better security, at times it may be necessary to clear the contents of the flip-flops and memory included as part of the systems-on-chip (SoCs) associated with the hardware. Because of the large number of flip-flops and memory cells included in the SoCs, the clearing of the state of the flip-flops and the internal memory included as part of the SoCs is non-trivial. Accordingly, there is a need for systems and methods for state clearing of flip-flops and internal memory.

SUMMARY

In one example, the present disclosure relates to a method for state clearing of internal memories and flip-flops of a system for a security reason. The method includes a security processor fetching memory built-in self-test (MBIST) data and providing the MBIST data to an internal field-test (IFT) controller associated with the system such that the IFT controller can drive the MBIST data via an internal joint test action group (IJTAG) network to respective MBIST controllers within the system. The method may further include the security processor fetching scan data and providing the scan data to the IFT controller such that the IFT controller can drive the scan data via a scan network to respective embedded deterministic test (EDT) controllers within the system.

The method may further include each of the respective MBIST controllers, within the system, state clearing respective internal memories by writing pertinent MBIST data into the respective internal memories. The method may further include each of the respective EDT controllers, within the system, state clearing respective flip-flops by writing pertinent scan data into the respective flip-flops.

In another example, the present disclosure relates to a method for state clearing of internal memories and flip-flops of a system for a security reason. The method includes a security processor fetching memory built-in self-test (MBIST) data, validating the MBIST data, and providing the validated MBIST data to an internal field-test (IFT) controller associated with the system such that the IFT controller can drive the validated MBIST data via an IJTAG network to respective MBIST controllers within the system. The method may further include the security processor fetching scan data, validating the scan data, and providing the validated scan data to the IFT controller such that the IFT controller can drive the validated scan data via a scan network to respective embedded deterministic test (EDT) controllers within the system.

The method may further include upon receiving pertinent MBIST data, each of the respective MBIST controllers, within the system, state clearing respective internal memories by writing the pertinent MBIST data into the respective internal memories. The method may further include upon receiving pertinent scan data, each of the respective EDT controllers, within the system, state clearing respective flip-flops by writing the pertinent scan data into the respective flip-flops.

In yet another example, the present disclosure relates to a system comprising a plurality of memory built-in self-test (MBIST) controllers within the system coupled to respective internal memories within the system. The system may further include a plurality of embedded deterministic test (EDT) controllers within the system coupled to respective flip-flops within the system.

The system may further include a security processor, for a security reason, configured to: (1) fetch memory built-in test (MBIST) data, validate the MBIST data and provide the validated MBIST data to an internal field-test (IFT) controller associated with the system such that the IFT controller can drive the validated MBIST data via an IJTAG network to respective MBIST controllers within the system, and (2) fetch scan data, validate the scan data, and provide the validated scan data to the IFT controller such that the IFT controller can drive the validated scan data via a scan network to respective EDT controllers within the system. Each respective MBIST controller, within the system, may be configured to state clear respective internal memories by writing pertinent MBIST data into the respective internal memories, and each respective EDT controller, within the system, configured to state clear respective flip-flops by writing pertinent scan data into the respective flip-flops.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to state clearing of internal memory and flip-flops of a system (e.g., a system on chip (SoC)) using built-in test and scan circuitry included within the system. As noted earlier, the users of a cloud system typically have access to the platform hardware, the operating systems. and other authorized applications running on the platform. Multiple users can have access to the same hardware offered by the platform, including a server, or a cluster of servers, over time. To allow for better security, at times it may be necessary to clear the contents of the flip-flops and memory included as part of the systems-on-chip (SoCs) associated with the hardware. Because of the large number of flip-flops and memory cells included in the SoCs, the clearing of the contents of the flip-flops and the memory included as part of the SoCs is non-trivial. Moreover, having custom reset logic for all such flip-flops and memory is impractical. Certain examples further relate to security-related state clearing of the contents of the flip-flops and the internal memory using "built-in test and scan circuitry". As used herein the term "built-in test and scan circuitry" includes circuitry included in the system (e.g., the SoC) for testing during manufacturing or design of the SoC, including circuitry for running stress test patterns during burn-in-testing of the flip-flops. This use of the built-in test and scan circuitry for state clearing the contents of flip-flops and memory cells within the SoC obviates the need for including additional circuitry in the SoC, whose sole purpose may be to allow the clearing of the contents of the flip-flops and the memory cells within the SoC.

Figure 1:
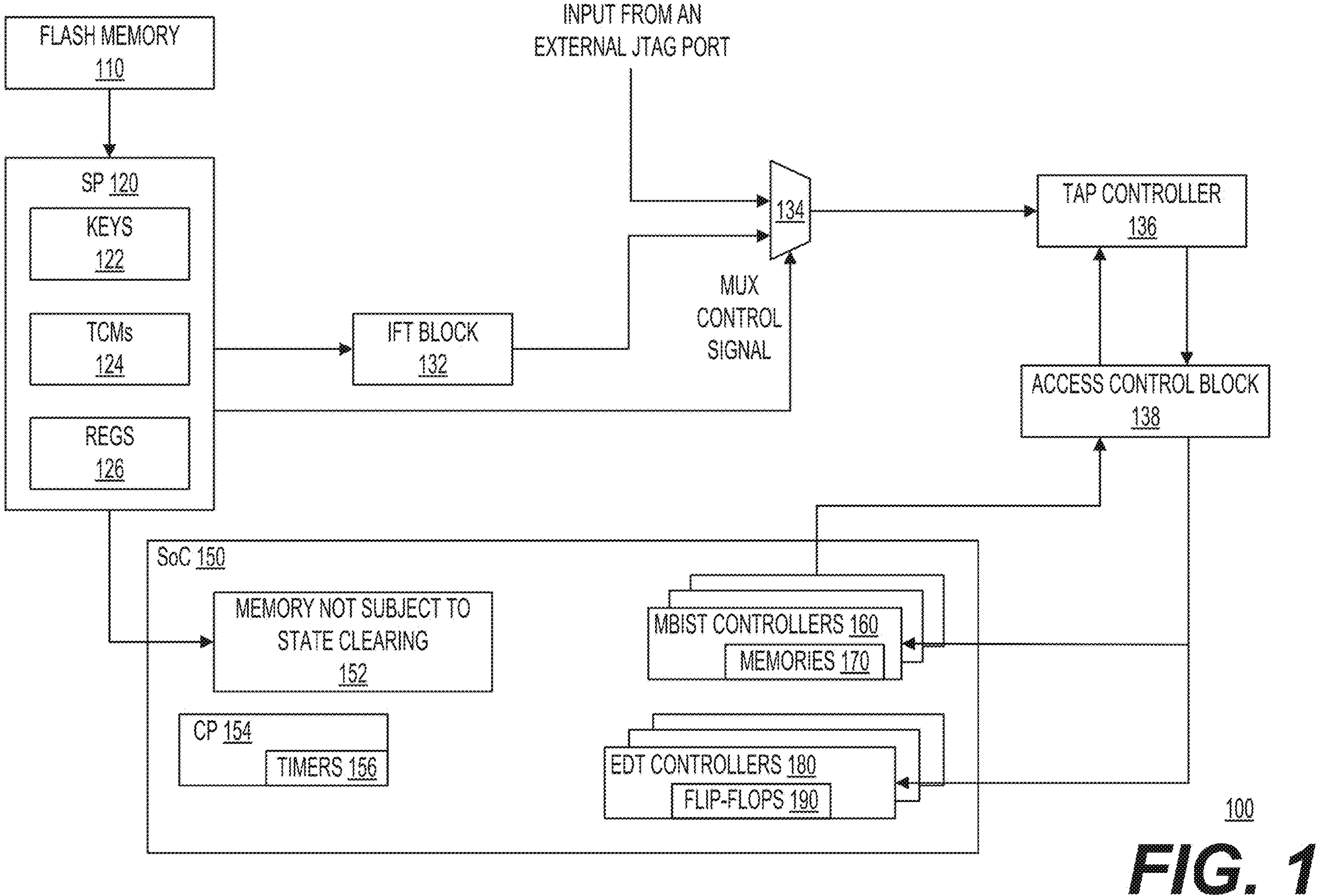
FIG. 1 is a block diagram of a system environment for state clearing of the internal memory and the flip-flops in a system on chip (SoC) in accordance with one example.

FIG. 1 is a block diagram of a system environment 100 for state clearing of internal memory and flip-flops in a system on chip (SoC) in accordance with one example. System 100 includes flash memory 110, a security processor (SP) 120, and a system on chip (SoC) 150, and additional components described later. Flash memory 110 includes firmware, including boot code for booting up system 100. Flash memory 110 is coupled with SP 120, which allows SP 120 to read the content stored in flash memory 110 and execute instructions related to the state clearing of internal memory and the flip-flops. In one example, the clearing of the internal memory and the flip-flops is performed at least at boot time.

In terms of the operation, in one example, when using secure boot with signed firmware images, only the firmware images signed with a private Rivet-Shamir-Adleman (RSA) key (or a similar key) that matches the public key fused into a one-time programmable (OTP) memory (or another such non-volatile memory) may be loaded. Thus, the boot process for a device (e.g., an SoC) may begin with a bootloader (e.g., a ROM bootloader) reading the signed firmware image header. The image header will contain the signature of the image and the public key corresponding to the private key used to generate the signature. The signature may be a secure hash algorithm (SHA)-348 (or SHA-256) hash of the firmware image. Once the image header is read, the public key may be extracted and a SHA-348 hash is generated for the key. This hash may be compared to the hash of the public key fused in the OTP memory. If these hashes match, then that means that the firmware image was signed with the correct key, so the boot may proceed. Additional or fewer steps may be used in the process of validating the firmware image. In one example, the validated firmware image contains the data that is used to clear state of one or both of the internal memories and the flip-flops within an SoC.

With continued reference to FIG. 1, SP 120 may be implemented using a secure processor that includes secure memory, cryptographic blocks, and tamper resistance. SP 120 may support the use of various key sizes, including key sizes of 128, 192, and 256 bits stored as keys 122. In one example, the tightly-coupled memories (TCMs) 124 may include code that is being executed by SP 120. The keys 122 may not be directly accessed via software; instead, a system key can be used with an encryption code to encrypt critical data in a system-specific way. Any of Rivet-Shamir-Adleman (RSA) and elliptic curve digital signature algorithm (ECDSA) signature generation and verification algorithm may be used. SP 120 may further include registers 126, which may allow SP to store additional configuration and/or control values. SP 120 may communicate with other components, such as the flash memory 110, via a serial peripheral interface (SPI) bus. In other examples, other interfaces may be supported, including an I2C and/or a general purpose input/output (GPIO) interface.

Still referring to FIG. 1, for simplicity, only those aspects of the SoC 150 that are relevant to the state clearing operations described herein are shown. SoC 150 incudes memory not subject to state clearing 152, control processor (CP) 154, timers 156, MBIST controllers 160, memories 170 (which may be the internal memories that require state clearing), EDT controllers 180, and flip-flops 190 (which may be the internal logic that requires state clearing). Examples of the SoC 150 include CPUs, GPUs, FPGAs, ASICs, Complex Programmable Logic Devices (CPLDs), storage controllers (e.g., controllers for SSDs or HDDs), networking controllers (e.g., controllers for switches, routers, firewalls, and bridges), or any other devices in a data center that may require clearing of the flip-flops and memory, and which include the built-in test and/or the scan circuitry described herein.

With continued reference to FIG. 1, system environment 100 further includes an in-field-test (IFT) block 132, which is configured to translate a peripheral bus (e.g., an advanced peripheral bus (APB) corresponding to the ARM architecture) into a joint test action group (JTAG) format bus. The JTAG formatted output of IFT block 132 is coupled as one of the inputs to a multiplexer 134. The other input of the multiplexer 134 is coupled to receive input from an external JTAG port (not shown). Based on a control signal (labeled as MUX CONTROL SIGNAL in FIG. 1), multiplexer 134 can selectively output either the input received from the IFT block 132 or the input received from an external JTAG port. The output provided by the multiplexer 134 is coupled to a test-access port (TAP) controller 136. This way, SP 120 can selectively couple the output of the IFT block 132 to the input of TAP controller 136. The IFT block 132 can be implemented as a finite state machine (or with other type of logic) to allow it to drive data to the various internal data-paths for providing the state clearing data to respective controllers.

Still referring to FIG. 1, to enable access control to the relevant busses within the system, an access control block 138 is included as part of the system environment 100. In this example, access control block 138 can allow (or disallow) access to the TAP controller 136. SP 120 can set up access control block 138 to allow or deny access to test data registers and other aspects associated with the MBIST controllers 160, the EDT controllers 180, and other functionality, such as clock control. In this example, the code that is necessary to perform these tasks is stored in a non-volatile memory (e.g., the flash memory 110 of FIG. 1). This code is transferred into the SoC via an interface between the SP 120 and flash memory 110 of FIG. 1. Next, the code is executed by the SP 120 of FIG. 1 or a similar secure processor. Although FIG. 1 shows system environment 100 having certain components that are arranged in a certain manner, system environment 100 may include additional or fewer components that are arranged differently.

Figure 2:
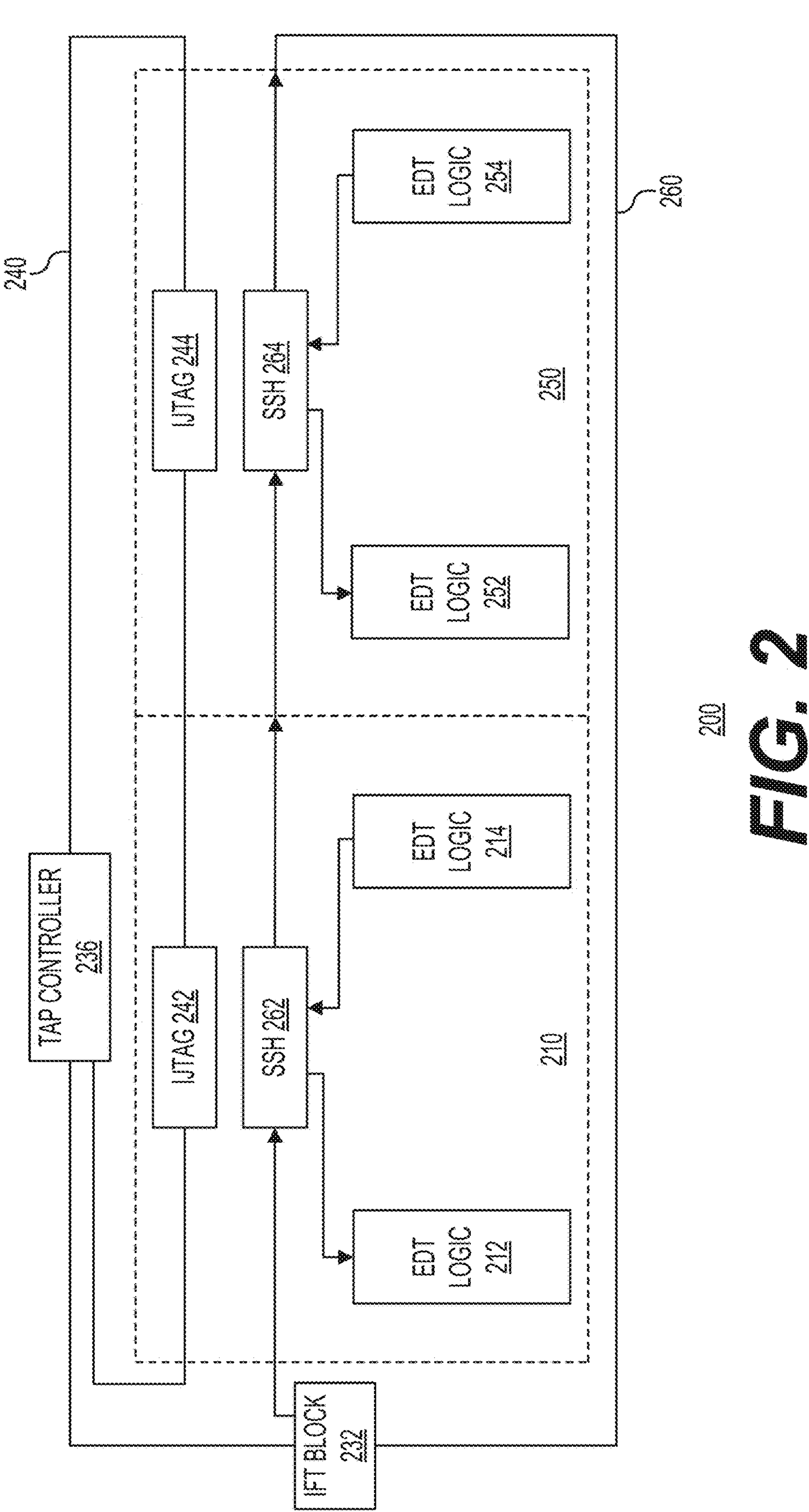
FIG. 2 is a block diagram of a system for state clearing of the internal memory and the flip-flops in a system on chip (SoC) in accordance with one example.

FIG. 2 is a block diagram of a system 200 for state clearing of internal memory and flip-flops in a system on chip (SoC) in accordance with one example. System 200 shows two portions of an SoC, including portion 210 and portion 250. In one example, these portions may correspond to chiplets associated with the SoC. System 200 includes an internal JTAG (IJTAG) network 240 and a scan network (SN) 260. Both the IJTAG network 240 and the SN 260 span the entire SoC. System 200 further includes an IFT block 232 (e.g., similar to IFT block 132 of FIG. 1) and a TAP controller 236 (e.g., similar to TAP controller 136 of FIG. 1). In this example, IJTAG network 240 originates in the TAP controller 236 and connects all of the test data registers (TDRs) included as part of the SoC design. The IJTAG network 240 is used to program the various test data registers (TDRs). The TDRs (e.g., IJTAG 242 and IJTAG 244) for controlling the MBIST controllers (e.g., any of MBIST controllers 160 of FIG. 1) are one example of the registers controlled by the IJTAG network 240.

Additional examples of the registers controlled by the IJTAG network 240 include the registers (not shown) for controlling the phase-locked loops (PLLs) to set the PLLs into a state clearing mode. The IJTAG network 240 can also be used to control the clocks and the resets, as needed. In one example, the memory cells are cleared using the IJTAG network 240. In other words, when a payload is meant for the IJTAG network 240, the IFT block 232 accesses the IJTAG network 240 inside the SoC via the input pins associated with the TAP controller 236. Although not shown in FIG. 2, the output of the IFT block 232 (e.g., similar to IFT block 132 of FIG. 1) is multiplexed with the GPIO pins (for any inputs from the external JTAG port) to access the TAP controller 236 (which is similar to TAP controller 136 of FIG. 1). In this example, the output of the TAP controllers 236 has access to the entire IJTAG network 240.

With continued reference to FIG. 2, the SN 260 is a bus that is configured to carry scan data around the SoC, including through portions 210 and 250 of the SoC. Portions 210 and 250 of the SoC may correspond to scan partitions. The SN 260 is configured to reach each physical partition of the SoC design and embedded deterministic test (EDT) logic connected with the SN 260. In this example, SN 260 includes stream scanning hosts (e.g., SSH 262 and SSH 264). EDT logic 212 in portion 210 of the SoC is coupled with SSH 262 and EDT logic 214 in portion 210 of the SoC is coupled with SSH 262, as well. EDT logic 252 in portion 250 of the SoC is coupled with SSH 264 and EDT logic 254 in portion 250 of the SoC is coupled with SSH 264, as well. The SN 260 is used to deliver scan data throughout the SoC. During manufacturing screening processes the same SN 260 interfaces with external controllers (not shown). When the IFT block 232 accesses the SN 260, in this example, it follows the same methodology as is used during manufacturing test screens. Thus, the IFT block 232 can send packets containing the input stimulus, output response, and any mask information on a per shift basis. The packets can also include configuration information that sets up the data path (along SN 260) so that the packetized data reaches the correct endpoint in the SN 260.

As part of the clearing of the memory cells and the flip-flops, both the IJTAG network (e.g., IJTAG network 240 and SN 160 of FIG. 2) are intercepted by the IFT block 232. As noted earlier, in this example, the IFT block 232 is a bus endpoint (e.g., an APB endpoint) such that its address (e.g., a single address) can be mapped to the bus network (e.g., an APB network). A co-processor included as part of the SoC (e.g., SP 120 of FIG. 1) can use the bus network (e.g., the APB network) to provide information to the IFT block (e.g., by writing 32-bit words to the IFT block 232). The IFT block 232 can decode the information (e.g., included as part of a 32-bit word) and send instructions, or data, to either the IJTAG network 240 or the SN 260. Although FIG. 2 shows system 200 having certain components that are arranged in a certain manner, system 200 may include additional or fewer components that are arranged differently. As an example, although FIG. 2 shows system 200 with a certain example of a scan network, system 200 can include other types of scan networks, as well, that have a similar functionality.

Scan data used for writing the memory cells with zeros or ones and for writing random values into the flip-flops is a large amount of data that is stored off-chip initially. To allow for secure and fast processing of the data, a vector file with the scan data can be created. An encryption engine can be used to generate hashes (e.g., SHA-384 hashes) for the chunks (e.g., N chunks with each having a certain kilobytes of data) of the vector file. The hashes are stored in another file—the vector hash file (VHF). The hashes are digitally signed using a private key. During the state clearing operation modes, firmware (e.g., stored in flash memory 110 of FIG. 1) loads the signed VHF and verifies the digital signature. If the signature check fails, then the state clearing process is aborted. If the signature check succeeds, then the signature check is performed for each of the N chunks (from i=0 to N−1) of the vector file using the steps in Table 1 below:

TABLE 1

| | |
|---|---|
| 1. | Load VF chunk[i] into the internal memory (e.g., the SRAM associated with the SoC). |
| 2. | Calculate SHA-384 hash of chunk[i]. |
| 3. | Compare the calculated hash of chunk[i] against the VHF's hash[i]. |
| 4. | If the hashes do not compare, then abort the state clearing process. |
| 5. | If the hashes do compare, then proceed with sending chunk[i] to the IFT block (e.g., IFT block 132 of FIG. 1) via the peripheral bus (e.g., the APB). |

Figure 3:
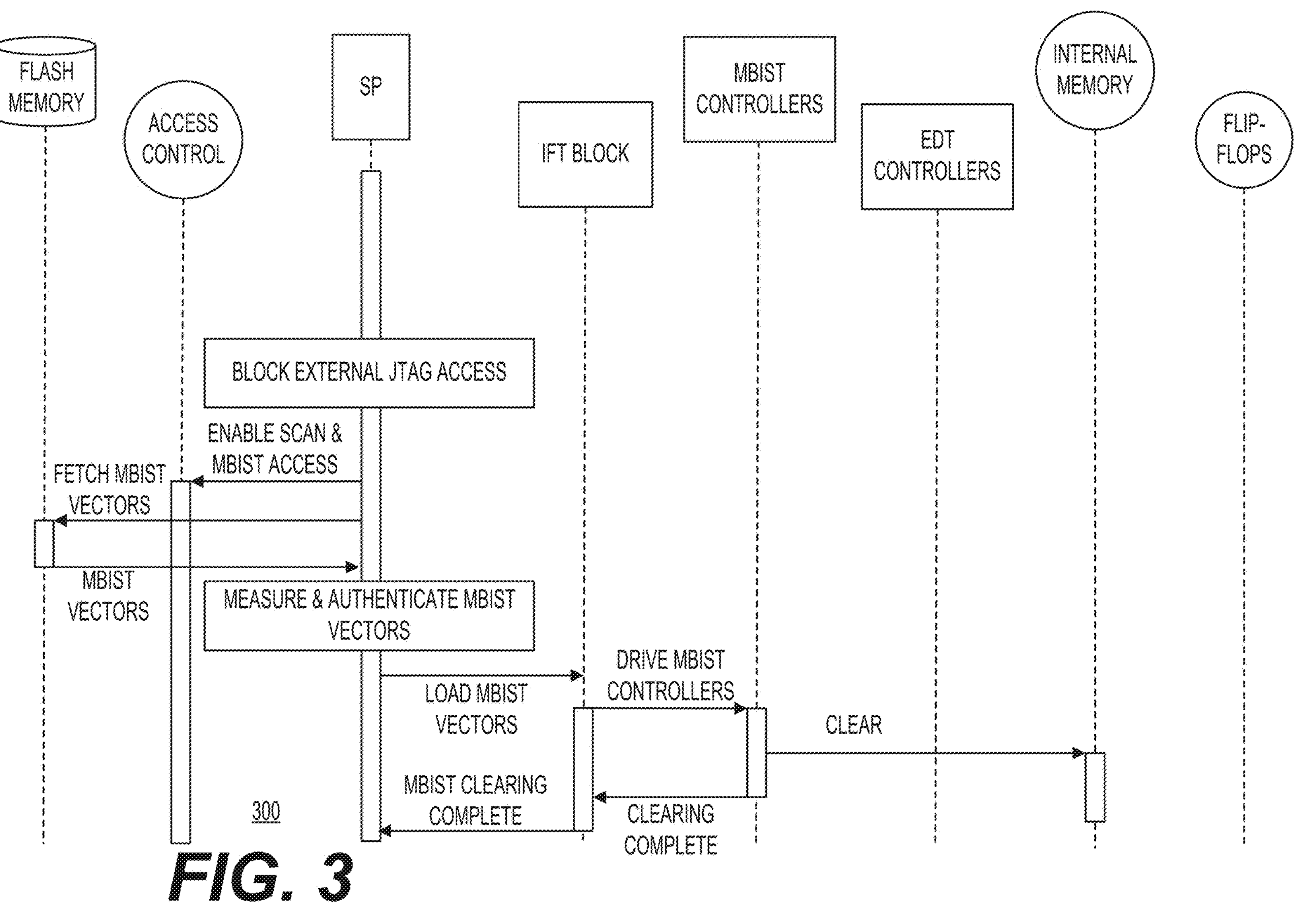
FIG. 3 shows an example state clearing operation flow for clearing the internal memories of a system on chip (SoC)

FIG. 3 shows an example state clearing operation flow 300 for clearing the internal memories of an SoC. As an initial matter, a security processor (SP) (e.g., SP 120 of FIG. 1) prepares the SoC for the clearing of the internal memories (e.g., the SRAM included as part of the SoC). Next, the SP initiates the memory clearing operation. As shown as part of the state clearing operation flow 300, the SP blocks the external JTAG access to the internal memories of the SoC. Thus, as shown in FIG. 1, the SP 120 via the MUX CONTROL SIGNAL ensures that any inputs from the external JTAG are blocked. In addition, the SP also blocks any external access to the internal memories and the flip-flops, via access control block 138 of FIG. 1, prior to the state clearing. In addition, the security processor (e.g., SP 120 of FIG. 1) is configured to ensure that the state clearing of the internal memories of the SoC and the flip-flops occurs before any other component associated with the SoC can access the contents of the internal memories or the flip-flops. The security processor can ensure this because it is not only configured to perform state clearing, but also to control other aspects of the SoC, including access by other components to the internal memories of the SoC and the flip-flops.

With continued reference to FIG. 3, next, the SP enables the EDT controllers and the MBIST controllers to access the relevant busses in order to allow the loading of the data that is used for clearing the state of the internal memories and the flip-flops. Next, the SP fetches the MBIST data (e.g., MBIST vectors). As explained earlier, the MBIST data used for clearing the state of the internal memories is stored as vector files, and chunks of these files can be fetched using the process shown in table 1 earlier. After the MBIST vectors are fetched, as part of the state clearing operation flow 300, the MBIST vectors are measured and authenticated. This step includes performing certain measurements using an appropriate measurement algorithm and authenticating the MBIST vectors if the measurements indicate a success. These measurements may be part of a root of trust chain. Next, the validated MBIST vectors are loaded into the IFT block (e.g., IFT block 232 of FIG. 2). The IFT block drives the TAP controller (e.g., the TAP controller 236 of FIG. 2), which in turn uses the internal JTAG network (e.g., IJTAG network 240 of FIG. 2) to clear the state of the internal memory associated with the various MBIST controllers.

Still referring to FIG. 3, after the clearing of the internal memories has been completed, the IFT block notifies the SP. In one example, the state clearing operation will return a signal indicative of the completion of the state clearing operation (e.g., by returning a positive value for the DONE bit) for every MBIST controller that is involved in the memory clearing activity. As part of this example, the SP needs to only check for the DONE bit, which indicates that the state clearing operation has been completed. Given that at least one DONE bit will be returned for each MBIST controller that is involved as part of the state clearing operation, a large number of the DONE bits may be returned to the SP. In one example, the SP need not decode and interpret these returned status bits (e.g., the DONE bits). Instead, the SP can compare an expected value against whatever status bits are returned, and if there is any mis-compare, the SP can set a flag to indicate an error and exit the state clearing operation. Although FIG. 3 shows a certain number of steps being performed in a certain order, additional or fewer steps may be performed in the same order or a different order. In addition, the steps may be performed by components other than the ones identified in FIG. 3.

Figure 4:
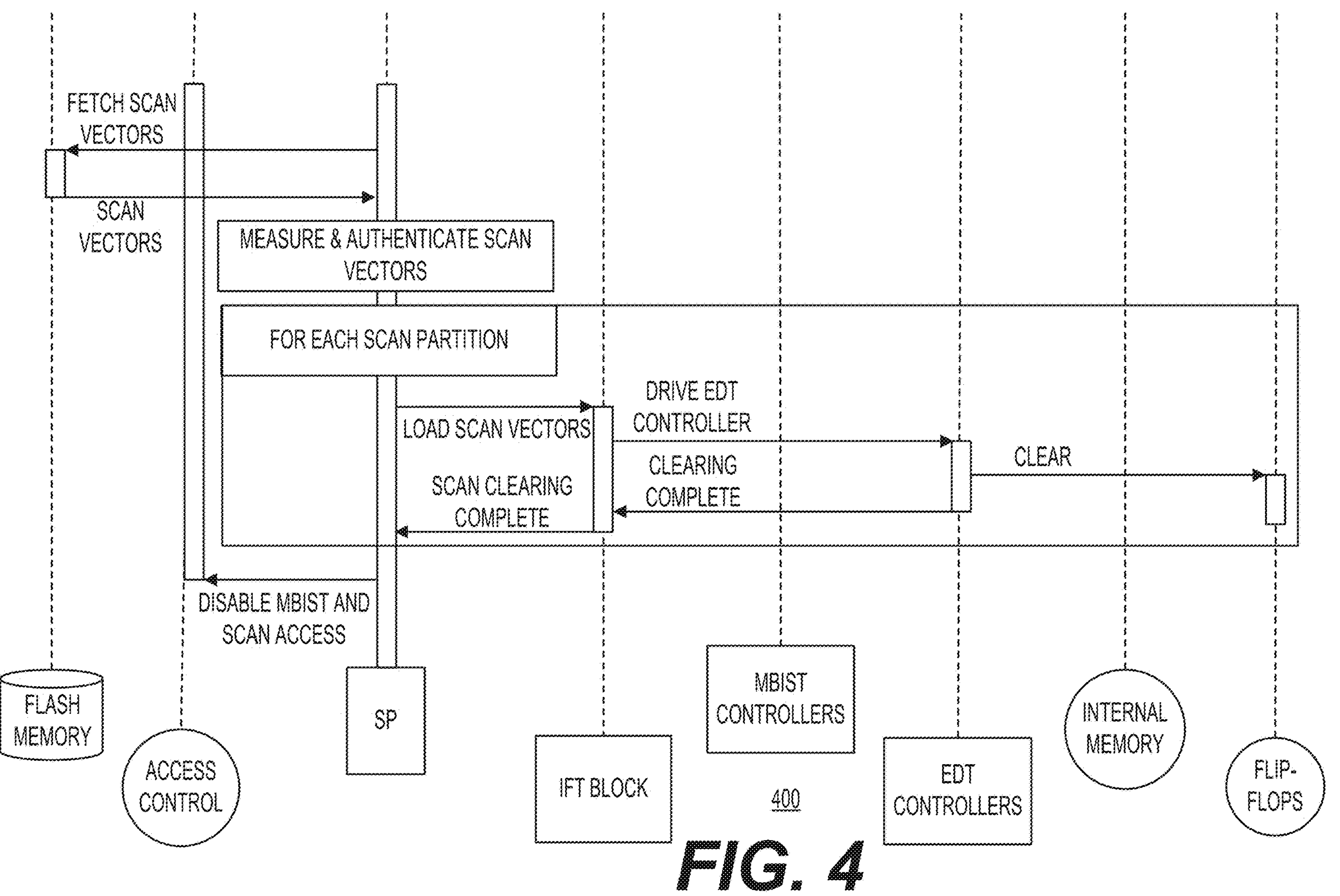
FIG. 4 shows an example state clearing operation flow for clearing the flip-flops of the same system on chip (SoC) as in FIG. 3.

FIG. 4 shows an example state clearing operation flow 400 for clearing the flip-flops of the SoC. The state clearing operation flow 400 is a continuation of the state clearing operation flow 300. Thus, the state clearing operation flow 400 assumes that the steps described prior to fetching the vectors for clearing the flip-flops of the SoC have already been performed. This allows the SP to clear both the internal memories and the flip-flops of the SoC in response to a single request for state clearing of the internal memories and the flip-flops of the SoC. As part of an initial step, as part of the state clearing of the flip-flops, the SP (e.g., SP 120 of FIG. 1) fetches the scan vector data. As explained earlier, similar to the MBIST data, the scan vector data used for clearing the state of the flip-flops is also stored as vector files, and chunks of these files can be fetched using the process shown in table 1 earlier. After the scan vectors are fetched, as part of the state clearing operation flow 400, the scan vectors are measured and authenticated. This step includes performing certain measurements using an appropriate measurement algorithm and authenticating the scan vectors if the measurements indicate a success. As noted earlier, these measurements may be part of a root of trust chain. Next, for each scan partition, the validated scan vectors are loaded into the IFT block (e.g., IFT block 232 of FIG. 2). The IFT block drives the scan network (e.g., SN 260 of FIG. 2), to clear the state of the flip-flops (e.g., by writing random values to the flip-flops in a similar manner as would be the case during the burn-in testing during manufacturing of the SoC) for each scan partition associated with the SoC.

Still referring to FIG. 4, after the clearing of the flip-flops has been completed, the IFT block notifies the SP. In one example, the state clearing operation will return a signal indicative of the completion of the state clearing operation (e.g., by returning a positive value for the DONE bit) for every EDT controller that is involved in the flip-flops clearing activity. As part of this example, the SP needs to only check for the DONE bit, which indicates that the state clearing operation is completed. Given that at least one DONE bit will be returned for each EDT controller that is involved as part of the state clearing operation, a large number of the DONE bits may be returned to the SP. In one example, similar to as described earlier, the SP need not decode and interpret these returned status bits (e.g., the DONE bits). Instead, the SP can compare an expected value against whatever status bits are returned, and if there is any mis-compare, the SP can set a flag to indicate an error and exit the state clearing operation. Finally, the SP disables access to both the MBIST controllers and the scan controllers. This ensures that no unauthorized access can be made to the MBIST controllers and the EDT controllers without the SP allowing such access. Although FIG. 4 shows a certain number of steps being performed in a certain order, additional or fewer steps may be performed in the same order or a different order. In addition, the steps may be performed by components other than the ones identified in FIG. 4.

Figure 5:
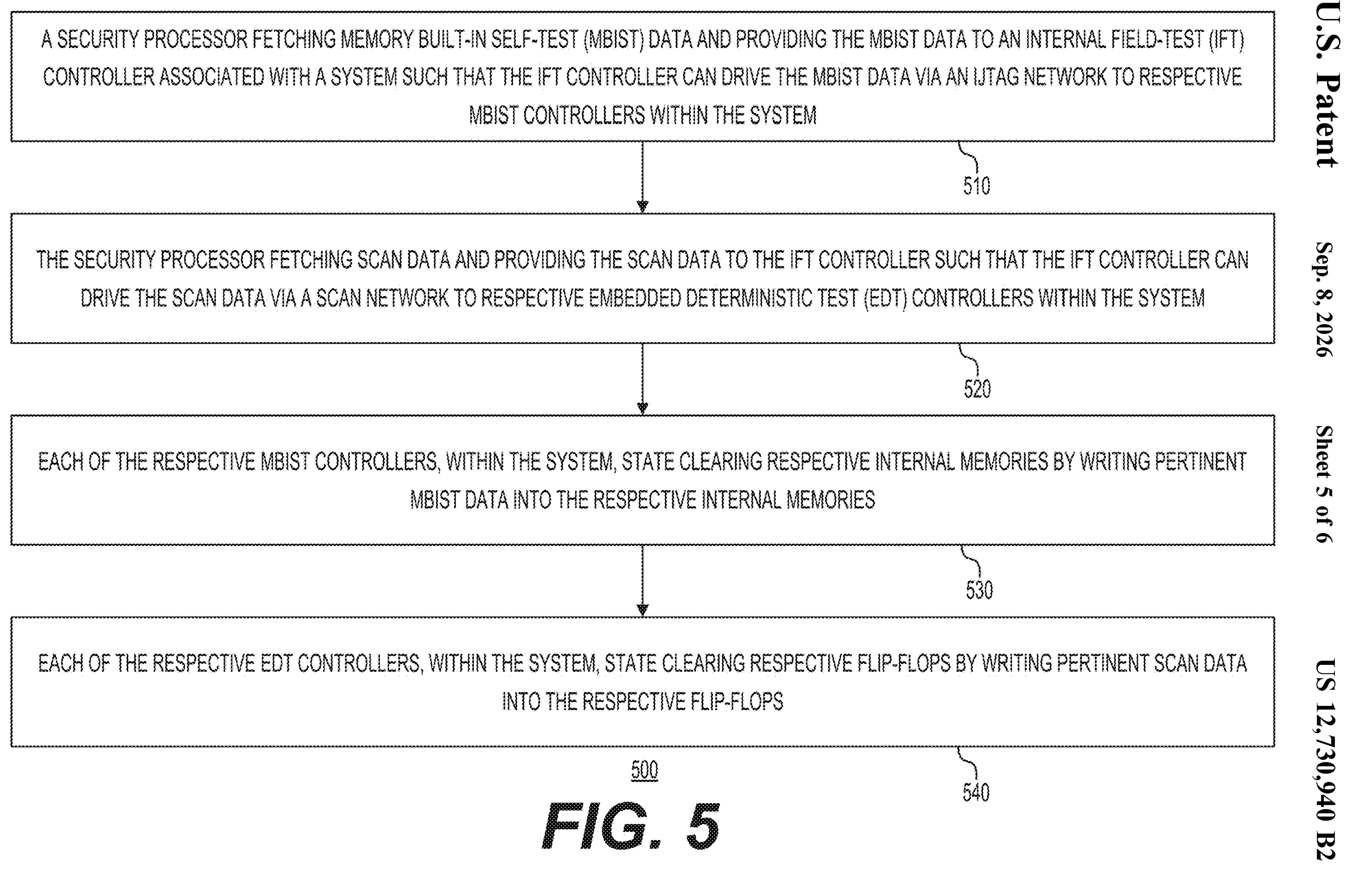
FIG. 5 shows a flow chart of a method for state clearing of the internal memories and the flip-flops of a system for security reasons in accordance with one example.

FIG. 5 shows a flow chart 500 of a method for state clearing of the internal memories and the flip-flops of a system for a security reason in accordance with one example. The steps shown as part of flow chart 500 may be performed to ensure that the confidentiality and the security of data is not compromised in situations where different tenants or users in a datacenter may have access to the system over time. As an example, a system may be available for use by a tenant, and at a later time, the same system may be made available to another tenant. The state clearing of both the internal memories and the flip-flops of the system allows confidential compute to occur. Step 510 includes a security processor fetching memory built-in self-test (MBIST) data and providing the MBIST data to an internal field-test (IFT) controller associated with the system such that the IFT controller can drive the MBIST data via an IJTAG network to respective MBIST controllers within the system. In one example, a security processor (e.g., SP 120 of FIG. 1) performs this step as described earlier with respect to FIGS. 1-3. The security processor can provide the MBIST data (e.g., the MBIST vectors described earlier) to the IFT controller (e.g., IFT block 132 of FIG. 3 or IFT block 232 of FIG. 2). As explained earlier with respect to FIGS. 1-3, the IFT controller can drive the MBIST data via the IJTAG network.

Step 520 includes the security processor fetching scan data and providing the scan data to the IFT controller such that the IFT controller can drive the scan data via a scan network to respective embedded deterministic test (EDT) controllers within the system. In one example, a security processor (e.g., SP 120 of FIG. 1) performs this step as described earlier with respect to FIGS. 1-3. The security processor can provide the scan data (e.g., the scan vectors described earlier) to the IFT controller (e.g., IFT block 132 of FIG. 3 or IFT block 232 of FIG. 2). As explained earlier with respect to FIGS. 1-4, the IFT controller can drive the scan data via the scan network.

Step 530 includes each of the respective MBIST controllers, within the system, state clearing respective internal memories by writing pertinent MBIST data into the respective internal memories. As explained earlier, the state clearing operation is performed by the MBIST controllers, which are part of the "built-in test and scan circuitry" for writing data to the internal memories. The reuse of the "built-in test and scan circuitry" obviates the need for custom logic for performing the state clearing operation with respect to the internal memories. This, in turn, saves valuable space within the integrated circuit chips since there is no need for additional custom logic.

Step 540 includes each of the respective EDT controllers, within the system, state clearing respective flip-flops by writing pertinent scan data into the respective flip-flops. As explained earlier, the state clearing operation is performed by the EDT controllers (e.g., on a per scan partition basis), which are part of the "built-in test and scan circuitry" for writing data to the flip-flops included in the logic within the system. The reuse of the "built-in test and scan circuitry" obviates the need for custom logic for performing the state clearing operation with respect to the flip-flops. This, in turn, saves valuable space within the integrated circuit chips since there is no need for additional custom logic. Although FIG. 5 shows a certain number of steps being performed in a certain order, additional or fewer steps may be performed in the same order or a different order. As an example, although flowchart 500 of FIG. 5 shows state clearing of both the internal memories and the flip-flops, the state clearing need not be performed together at the same time. As an example, the security processor (e.g., SP 120 of FIG. 1) could initiate state clearing of only the internal memories or the flip-flops at a given time. In addition, only a subset of the internal memories or a subset of the flip-flops may be cleared as part of the state clearing operation.

Figure 6:
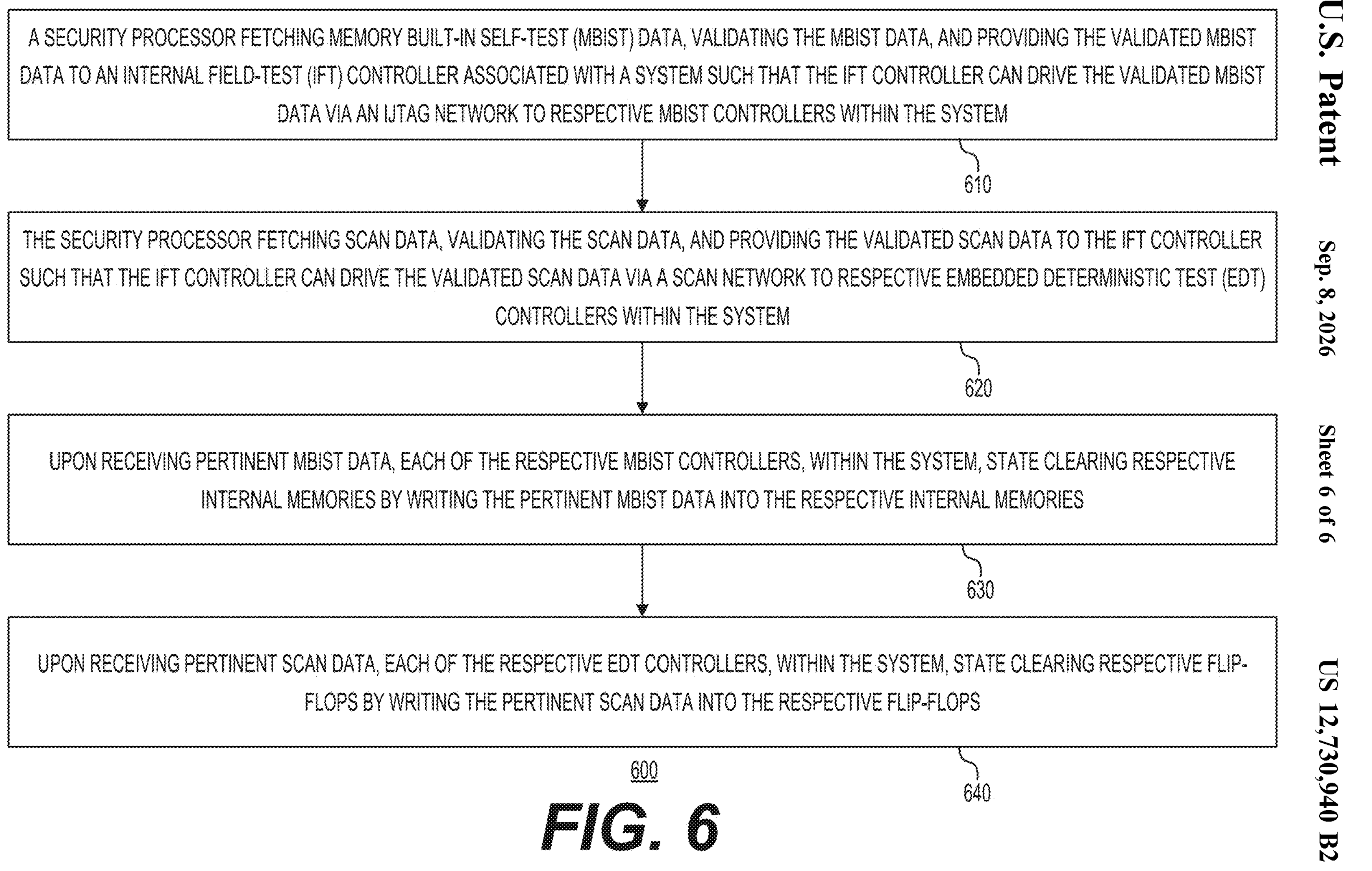
FIG. 6 shows a flow chart of another method for state clearing of the internal memories and the flip-flops of a system for security reasons in accordance with one example.

FIG. 6 shows a flowchart 600 of another method for state clearing of the internal memories and the flip-flops of a system for a security reason in accordance with one example. The steps shown as part of the flow chart 600 may be performed to ensure that the confidentiality and the security of data is not compromised in situations where different tenants or users in a datacenter may have access to the same system over time. As an example, a system may be available for use by a tenant, and at a later time, the same system may be made available to another tenant. The state clearing of both the internal memories and the flip-flops of the system allows confidential compute to occur. Step 610 includes a security processor fetching memory built-in self-test (MBIST) data, validating the MBIST data, and providing the validated MBIST data to an internal field-test (IFT) controller associated with the system such that the IFT controller can drive the validated MBIST data via an IJTAG network to respective MBIST controllers within the system. In one example, a security processor (e.g., SP 120 of FIG. 1) performs this step as described earlier with respect to FIGS. 1-3. As explained earlier, the security processor can validate the MBIST data by performing certain measurements. The security processor can provide the validated MBIST data (e.g., the MBIST vectors described earlier) to the IFT controller (e.g., IFT block 132 of FIG. 3 or IFT block 232 of FIG. 2). As explained earlier with respect to FIGS. 1-3, the IFT controller can drive the MBIST data via the IJTAG network.

Step 620 includes the security processor fetching scan data, validating the scan data, and providing the validated scan data to the IFT controller such that the IFT controller can drive the validated scan data via a scan network to respective embedded deterministic test (EDT) controllers within the system. In one example, a security processor (e.g., SP 120 of FIG. 1) performs this step as described earlier with respect to FIGS. 1-3. As explained earlier, the security processor can validate the scan data by performing certain measurements. The security processor can provide the validated scan data (e.g., the scan vectors described earlier) to the IFT controller (e.g., IFT block 132 of FIG. 3 or IFT block 232 of FIG. 2). As explained earlier with respect to FIGS. 1-4, the IFT controller can drive the validated scan data via the scan network.

Step 630 includes upon receiving pertinent MBIST data, each of the respective MBIST controllers, within the system, state clearing respective internal memories by writing the pertinent MBIST data into the respective internal memories. As explained earlier, the state clearing operation is performed by the MBIST controllers, which are part of the "built-in test and scan circuitry" for writing data to the internal memories. The reuse of the "built-in test and scan circuitry" obviates the need for custom logic for performing the state clearing operation with respect to the internal memories. This, in turn, saves valuable space within the integrated circuit chips since there is no need for additional custom logic.

Step 640 includes upon receiving pertinent scan data, each of the respective EDT controllers, within the system, state clearing respective flip-flops by writing the pertinent scan data into the respective flip-flops. As explained earlier, the state clearing operation is performed by the EDT controllers (e.g., on a per scan partition basis), which are part of the "built-in test and scan circuitry" for writing data to the flip-flops included in the logic within the system. The reuse of the "built-in test and scan circuitry" obviates the need for custom logic for performing the state clearing operation with respect to the flip-flops. This, in turn, saves valuable space within the integrated circuit chips since there is no need for additional custom logic. Although FIG. 6 shows a certain number of steps being performed in a certain order, additional or fewer steps may be performed in the same order or a different order. As an example, although flowchart 600 of FIG. 6 shows state clearing of both the internal memories and the flip-flops, the state clearing need not be performed together at the same time. As an example, the security processor (e.g., SP 120 of FIG. 1) could initiate state clearing of only the internal memories or the flip-flops at a given time. In addition, only a subset of the internal memories or a subset of the flip-flops may be cleared as part of the state clearing operation.

In conclusion, the present disclosure relates to a method for state clearing of internal memories and flip-flops of a system for a security reason. The method includes a security processor fetching memory built-in self-test (MBIST) data and providing the MBIST data to an internal field-test (IFT) controller associated with the system such that the IFT controller can drive the MBIST data via an internal joint test action group (IJTAG) network to respective MBIST controllers within the system. The method may further include the security processor fetching scan data and providing the scan data to the IFT controller such that the IFT controller can drive the scan data via a scan network to respective embedded deterministic test (EDT) controllers within the system.

The method may further include each of the respective MBIST controllers, within the system, state clearing respective internal memories by writing pertinent MBIST data into the respective internal memories. The method may further include each of the respective EDT controllers, within the system, state clearing respective flip-flops by writing pertinent scan data into the respective flip-flops.

The method may further include: (1) blocking external JTAG access to a test access port (TAP) controller within the system, and (2) granting bus access to the MBIST controllers within the system and the EDT controllers within the system. The method may further include loading instructions for state clearing into a volatile memory within the system from firmware contained in a non-volatile memory external to the system. The non-volatile memory may further include boot code for booting the system, and the method may further comprise state clearing the internal memories and the flip-flops within the system during booting up the system.

The MBIST controllers and the EDT controllers may be integrated within the system for performing tests during manufacturing of the system. As a result of a reuse of the MBIST controllers and the EDT controllers in a production environment, the state clearing may be performed without requiring extra dedicated reset logic for the internal memories and the flip-flops within the system.

In another example, the present disclosure relates to a method for state clearing of internal memories and flip-flops of a system for a security reason. The method includes a security processor fetching memory built-in self-test (MBIST) data, validating the MBIST data, and providing the validated MBIST data to an internal field-test (IFT) controller associated with the system such that the IFT controller can drive the validated MBIST data via an IJTAG network to respective MBIST controllers within the system. The method may further include the security processor fetching scan data, validating the scan data, and providing the validated scan data to the IFT controller such that the IFT controller can drive the validated scan data via a scan network to respective embedded deterministic test (EDT) controllers within the system.

The method may further include upon receiving pertinent MBIST data, each of the respective MBIST controllers, within the system, state clearing respective internal memories by writing the pertinent MBIST data into the respective internal memories. The method may further include upon receiving pertinent scan data, each of the respective EDT controllers, within the system, state clearing respective flip-flops by writing the pertinent scan data into the respective flip-flops.

The method may further include: (1) blocking external JTAG access to a test access port (TAP) controller within the system, and (2) granting bus access to the MBIST controllers within the system and the EDT controllers within the system. The method may further include loading instructions for state clearing into a volatile memory within the system from firmware contained in a non-volatile memory external to the system. The non-volatile memory may further include boot code for booting the system, and the method may further comprise state clearing the internal memories and the flip-flops within the system during booting up the system.

The MBIST controllers and the EDT controllers may be integrated within the system for performing tests during manufacturing of the system. As a result of a reuse of the MBIST controllers and the EDT controllers in a production environment, the state clearing may be performed without requiring extra dedicated reset logic for the internal memories and the flip-flops within the system.

In yet another example, the present disclosure relates to a system comprising a plurality of memory built-in self-test (MBIST) controllers within the system coupled to respective internal memories within the system. The system may further include a plurality of embedded deterministic test (EDT) controllers within the system coupled to respective flip-flops within the system.

The system may further include a security processor, for a security reason, configured to: (1) fetch memory built-in test (MBIST) data, validate the MBIST data and provide the validated MBIST data to an internal field-test (IFT) controller associated with the system such that the IFT controller can drive the validated MBIST data via an IJTAG network to respective MBIST controllers within the system, and (2) fetch scan data, validate the scan data, and provide the validated scan data to the IFT controller such that the IFT controller can drive the validated scan data via a scan network to respective EDT controllers within the system. Each respective MBIST controller, within the system, may be configured to state clear respective internal memories by writing pertinent MBIST data into the respective internal memories, and each respective EDT controller, within the system, configured to state clear respective flip-flops by writing pertinent scan data into the respective flip-flops.

The security processor may further be configured to block external JTAG access to a test access port (TAP) controller within the system. The security processor may further be configured to grant bus access to the MBIST controllers within the system and the EDT controllers within the system.

The security processor may further be configured to load instructions for state clearing into a volatile memory within the system from firmware contained in a non-volatile memory external to the system. The non-volatile memory may further comprise boot code for booting the system, and the security processor may further be configured to state clear the internal memories and the flip-flops within the system during booting up the system.

The security processor may further be configured to state clear the internal memories and the flip-flops within the system prior to taking the system out of a production environment for diagnostics and testing. The MBIST controllers and the EDT controllers may be integrated within the system for performing tests during manufacturing of the system. As a result of a reuse of the MBIST controllers and the EDT controllers in a production environment, state clearing may be performed without requiring extra dedicated reset logic for the internal memories and the flip-flops within the system.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), or Complex Programmable Logic Devices (CPLDs). In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method for state clearing of internal memories and flip-flops of a system for a security reason, the method comprising:

a security processor fetching memory built-in self-test (MBIST) data and providing the MBIST data to an internal field-test (IFT) controller associated with the system such that the IFT controller can drive the MBIST data via an internal joint test action group (IJTAG) network to respective MBIST controllers within the system;

the security processor fetching scan data and providing the scan data to the IFT controller such that the IFT controller can drive the scan data via a scan network to respective embedded deterministic test (EDT) controllers within the system;

each of the respective MBIST controllers, within the system, state clearing respective internal memories by writing pertinent MBIST data into the respective internal memories; and each of the respective EDT controllers, within the system, state clearing respective flip-flops by writing pertinent scan data into the respective flip-flops.

2. The method of claim 1, further comprising: (1) blocking external JTAG access to a test access port (TAP) controller within the system, and (2) granting bus access to the MBIST controllers within the system and the EDT controllers within the system.

3. The method of claim 2, further comprising loading instructions for state clearing into a volatile memory within the system from firmware contained in a non-volatile memory external to the system.

4. The method of claim 3, wherein the non-volatile memory further comprises boot code for booting the system, and wherein the method further comprises state clearing the internal memories and the flip-flops within the system during booting up the system.

5. The method of claim 1, wherein the MBIST controllers and the EDT controllers are integrated within the system for performing tests during manufacturing of the system.

6. The method of claim 5, wherein as a result of a reuse of the MBIST controllers and the EDT controllers in a production environment, the state clearing is performed without requiring extra dedicated reset logic for the internal memories and the flip-flops within the system.

7. A method for state clearing of internal memories and flip-flops of a system for a security reason, the method comprising:

a security processor fetching memory built-in self-test (MBIST) data, validating the MBIST data, and providing the validated MBIST data to an internal field-test (IFT) controller associated with the system such that the IFT controller can drive the validated MBIST data via an internal joint test action group (IJTAG) network to respective MBIST controllers within the system;

the security processor fetching scan data, validating the scan data, and providing the validated scan data to the IFT controller such that the IFT controller can drive the validated scan data via a scan network to respective embedded deterministic test (EDT) controllers within the system;

upon receiving pertinent MBIST data, each of the respective MBIST controllers, within the system, state clearing respective internal memories by writing the pertinent MBIST data into the respective internal memories; and upon receiving pertinent scan data, each of the respective EDT controllers, within the system, state clearing respective flip-flops by writing the pertinent scan data into the respective flip-flops.

8. The method of claim 7, further comprising: (1) blocking external JTAG access to a test access port (TAP) controller within the system, and (2) granting bus access to the MBIST controllers within the system and the EDT controllers within the system.

9. The method of claim 8, further comprising loading instructions for state clearing into a volatile memory within the system from firmware contained in a non-volatile memory external to the system.

10. The method of claim 9, wherein the non-volatile memory further comprises boot code for booting the system, and wherein the method further comprises state clearing the internal memories and the flip-flops within the system during booting up the system.

11. The method of claim 7, wherein the MBIST controllers and the EDT controllers are integrated within the system for performing tests during manufacturing of the system.

12. The method of claim 11, wherein as a result of a reuse of the MBIST controllers and the EDT controllers in a production environment, the state clearing is performed without requiring extra dedicated reset logic for the internal memories and the flip-flops within the system.

13. A system comprising:

a plurality of memory built-in self-test (MBIST) controllers within the system coupled to respective internal memories within the system;

a plurality of embedded deterministic test (EDT) controllers within the system coupled to respective flip-flops within the system;

a security processor, for a security reason, configured to: (1) fetch memory built-in test (MBIST) data, validate the MBIST data and provide the validated MBIST data to an internal field-test (IFT) controller associated with the system such that the IFT controller can drive the validated MBIST data via an internal joint test action group (IJTAG) network to respective MBIST controllers within the system, and (2) fetch scan data, validate the scan data, and provide the validated scan data to the IFT controller such that the IFT controller can drive the validated scan data via a scan network to respective EDT controllers within the system; and wherein: (1) each respective MBIST controller, within the system, configured to state clear respective internal memories by writing pertinent MBIST data into the respective internal memories, and (2) each respective EDT controller, within the system, configured to state clear respective flip-flops by writing pertinent scan data into the respective flip-flops.

14. The system of claim 13, wherein the security processor is further configured to block external JTAG access to a test access port (TAP) controller within the system.

15. The system of claim 13, wherein the security processor is further configured to grant bus access to the MBIST controllers within the system and the EDT controllers within the system.

16. The system of claim 13, wherein the security processor is further configured to load instructions for state clearing into a volatile memory within the system from firmware contained in a non-volatile memory external to the system.

17. The system of claim 16, wherein the non-volatile memory further comprises boot code for booting the system, and wherein the security processor is further configured to state clear the internal memories and the flip-flops within the system during booting up the system.

18. The system of claim 13, wherein the security processor is further configured to state clear the internal memories and the flip-flops within the system prior to taking the system out of a production environment for diagnostics and testing.

19. The system of claim 13, wherein the MBIST controllers and the EDT controllers are integrated within the system for performing tests during manufacturing of the system.

20. The system of claim 19, wherein as a result of a reuse of the MBIST controllers and the EDT controllers in a production environment, state clearing is performed without requiring extra dedicated reset logic for the internal memories and the flip-flops within the system.

* * * * *